Figure 1:
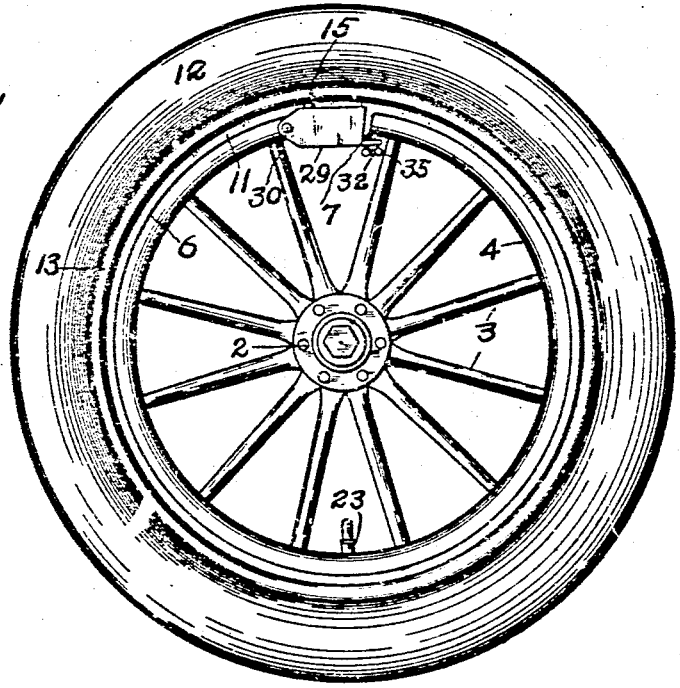

T. W. BROOMELL.
DETACHABLE WHEEL RIM.
APPLICATION FILED NOV. 28, 1908.

966,994.

Patented Aug. 9, 1910.
2 SHEETS—SHEET 1.

WITNESSES
Chas. H. Hughes,
R. L. Wallace.

INVENTOR
Thomas W. Broomell
BY Harry D. Wallace
ATTORNEY

T. W. BROOMELL.
DETACHABLE WHEEL RIM.
APPLICATION FILED NOV. 28, 1908.
966,994.
Patented Aug. 9, 1910.
2 SHEETS—SHEET 2.
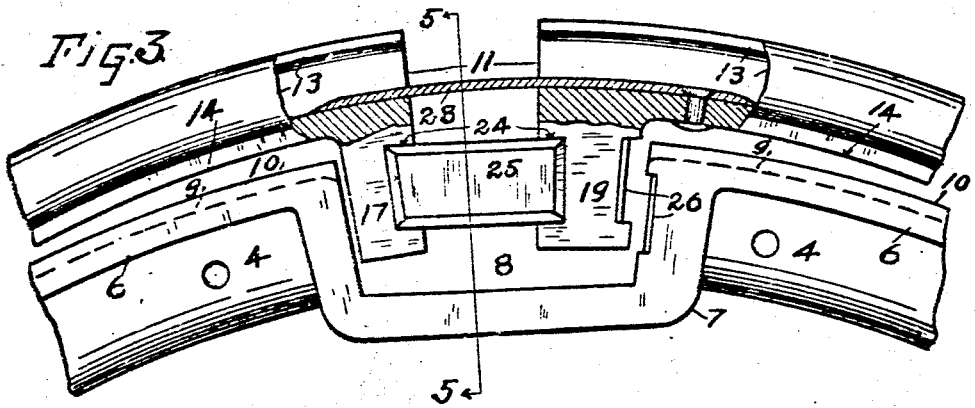
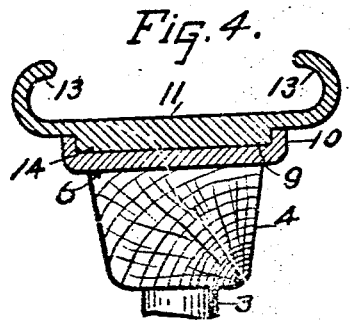
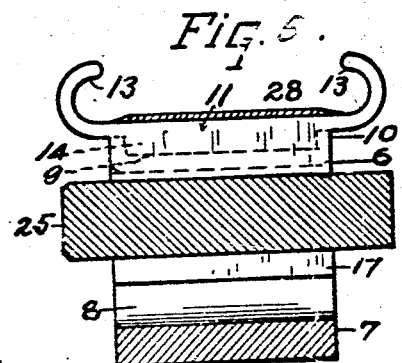
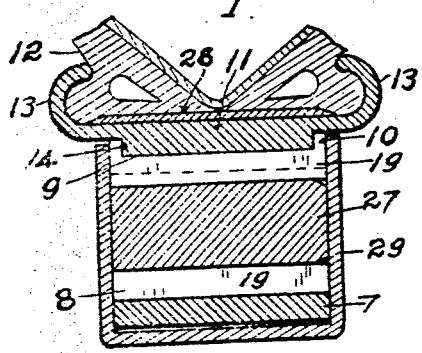
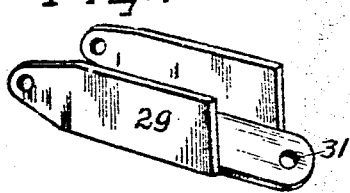
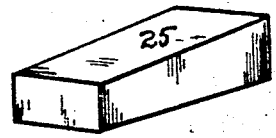
WITNESSES
Chas. H. Hughes
R. L. Wallace
INVENTOR
Thomas W. Broomell
BY Harry D. Wallace
ATTORNEY

UNITED STATES PATENT OFFICE.

THOMAS W. BROOMELL, OF YORK, PENNSYLVANIA, ASSIGNOR OF ONE-THIRD TO GEORGE A. LICHTENBERGER AND ONE-THIRD TO CHARLES H. BEAR, BOTH OF YORK, PENNSYLVANIA.

DETACHABLE WHEEL-RIM.

966,994.   Specification of Letters Patent.   Patented Aug. 9, 1910.

Application filed November 28, 1908. Serial No. 464,953.

*To all whom it may concern:*

Be it known that I, THOMAS W. BROOMELL, a citizen of the United States, residing at York, in the county of York and State of Pennsylvania, have invented certain new and useful Improvements in Detachable Wheel-Rims, of which the following is a specification.

This invention relates to improvements in detachable rims, designed for use in connection with vehicle wheels upon which pneumatic tires are employed, and the invention has for its object the providing of a one-part expansible rim, particularly of the class known as clencher-rims which carry the well-known clencher tires.

A further object is to provide a wheel constructed with reference to the application and operation of the detachable rim, and a further object is to provide simple but powerful means for expanding and contracting, as well as for securing the expansible rim in operative position.

The invention consists principally of a wheel for use on automobiles and like vehicles, which comprises a hub, spokes and a felly. The felly having a portion cut away to form a gap positioned between two of the spokes.

The invention further consists of a hoop made of metal and shrunk or otherwise rigidly secured to the felly of the wheel. The hoop having a stirrup-like portion which is fitted into the gap in the felly and forms an outwardly facing pocket: the hoop also having a flanged groove formed in its periphery.

The invention further consists of a detachable rim, preferably provided with hooked flanges, to receive the common clencher tube or shoe of pneumatic tires, the rim being cut at a point corresponding to the pocket in the hoop, to permit the same to be expanded for applying to the groove in the hoop. The rim having its inner circumference formed into a tongue substantially the length, breadth and depth of the groove in the hoop, and also having its opposite ends formed into inwardly projecting lugs which are disposed in the pocket when the rim is applied to a wheel.

The invention further consists of a key for drawing or forcing and holding the ends of the rim together, and also a wedge for use in spreading the ends and expanding the rim.

The invention further consists of simple means for inclosing and shielding the pocket and also to prevent the accidental loss of the key.

The invention further consists of the combination of parts hereinafter described in detail, illustrated by the accompanying drawings, and then particularly pointed out in the appended claims.

Figure 2:
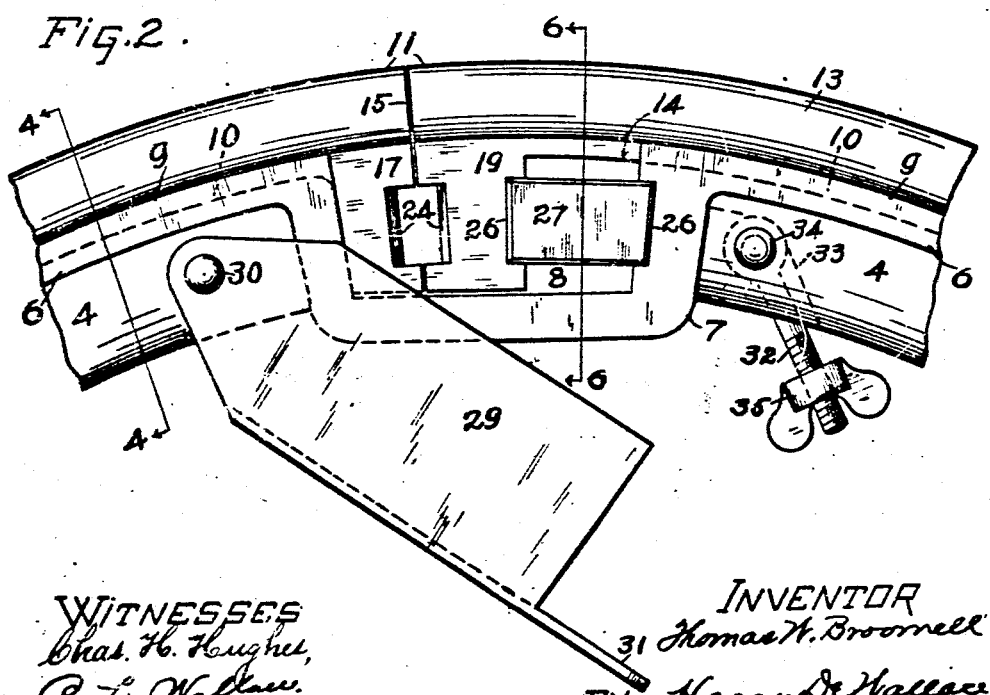

In the accompanying drawings. Figure 1 is a front side view of a complete pneumatic-tired wheel, having my improvement applied. Fig. 2 is an enlarged detail view of a portion of a wheel, the rubber tire parts being omitted, showing the rim closed and held in such position by the key; also showing the shield or keeper in the released position. Fig. 3 is a similar detail view, partly in section, showing the rim expanded to a greater diameter than that of the hoop; also showing the wedge in position for holding the ends of the rim apart. Fig. 4 is a cross section on line 4—4 of Fig. 2, showing the groove in the hoop; also showing the tongue of the rim seated in the groove, — the service position. Fig. 5 is a cross section on line 5—5 of Fig. 3, showing the location of the expanding wedge, also one lug of the rim, in relation to the pocket. Fig. 6 is a cross section on line 6—6 of Fig. 2, showing the position of the key when holding the ends of the rim together; also showing the shield in closed position. Fig. 7 is a perspective view of the shield. Fig. 8 is a perspective view of the wedge.

Similar numerals of reference are assigned to corresponding parts throughout the several figures.

In the drawings, my wheel consists of a hub 2, a number of spokes 3, and a felly 4. The felly may be made of any suitable material, but preferably has a section cut out between two of the spokes, in order to form a clear gap of several inches in length.

6 represents a metallic hoop or band which is fitted tightly around the felly, and is provided with an inwardly bent portion 7, which is rigidly fitted in the gap of the felly. In case the felly is made of wood, the hoop should be shrunk on to the felly the same as wagon tires are usually applied. The bent portion 7 of the hoop forms a pocket 8, and is intended to take the place, and perform the office, of the section of the felly which is cut away, so as to make this portion of the wheel as strong as the rest. The peripheral edge of the hoop is provided with parallel flanges 10, which form a shallow groove 9, as shown by full lines in Fig. 4 and by dotted lines in Figs. 2, 3 and 5.

The detachable rim consists of a clencher-rim 11, preferably made of a spring metal, which receives and holds an outer tube or shoe 12, which comprises the exposed portion of the well-known pneumatic tires; the shoe being held in place by oppositely facing hook-flanges 13. The inner circumference of the rim is formed into an integral tongue or rib 14, which corresponds to and is intended to snugly fit into groove 9 of the hoop. At a convenient point in the circle, rim 11 is cut, as at 15 (see Figs. 1 and 2), for the purpose of rendering the rim expansible and contractible. The opposing ends of the rim are provided with integral inwardly extending lugs 17 and 19, and the abutting faces of the lugs are indented or notched, as at 24, to receive a tapering wedge 25, which is employed for spreading the lugs and expanding the rim, as shown in Fig. 3. Fig. 5 shows the wedge after it has been driven between the lugs. Lug 19 is also provided with a notch 26 which corresponds to a similar notch formed in the end wall of the pocket. These notches are provided to receive a key 27 which is employed for forcing the lugs together and contracting the rim, as when the rim and tire are applied to a wheel for service (see Figs. 1 and 2). It will be noticed by reference to Fig. 3, that when the wedge is driven between the lugs to expand the rim, the rim rises above the wheel sufficiently to show a clear space between these parts. At such time the key notches 26 do not register with each other, but as soon as the rim is placed in position on a wheel, so that tongue 14 registers with groove 9, the wedge should be withdrawn from between the lugs, and then the rim will contract by its own power and settle down into the groove, and the notches 26 will be brought opposite each other, to permit the key to be driven in to close up the rim, as shown in Figs. 1 and 2. A bridge plate 28 is secured to one end of the rim, and extends across the gap when the rim is expanded to prevent the inner tube, in case one such is employed, from blowing-out. 29 represents a shield or keeper, angular in form, as shown in Figs. 1, 2, 3 and 7. This shield is pivoted to the felly near one end of the pocket 8 by a bolt or pin 30. The opposite end of the shield is provided with a lug having a perforation 31 which is arranged to receive a bolt 32, which is pivoted, in a slot 33 formed in the opposite end of the felly, by a screw or pin 34. 35 represents a thumb-nut which may be applied to bolt 32 for holding the shield in the closed position. The office of the shield is to prevent dust and dirt from entering the pocket, and also to prevent the loss of the key 27.

The usual filling tube for use in inflating the tire is indicated by the numeral 23. This tube is preferably disposed at the opposite side of the wheel from the pocket 8, and is inserted through the several parts of the wheel by means of suitable openings (not shown).

In practice all the wheels of a vehicle to which my detachable rim are to be applied should be constructed, as herein shown and described, each having a section cut from the felly, and having a hoop 6 provided with a pocket 8, and also a peripheral groove 9. The rims are intended to be interchangeable.

To apply the clencher tube or shoe to the rim, the rim should first be removed from the wheel, and the gap between the lugs 17 and 19 allowed to close by the force of the spring tension of the rim. The tube or shoe 12 may then be applied in the same manner as heretofore. After the shoe is fitted to the rim, the latter should be expanded by driving the wedge 25 between lugs 17 and 19. The inner tube may then be inflated with the usual working pressure, after which the rim is ready to be applied to the wheel. To do this, the wheel should be raised from the ground and adjusted so that the pocket is at the upper side of the wheel. The filling tube should first be inserted through the hoop and felly at the bottom of the wheel, and the rim and tire lifted upwardly until tongue 14 enters groove 9 at the under side of the wheel. The upper portion of the rim should then be swung over the top of the wheel, until the lugs enter the pocket and tongue 14 registers with groove 9 all around the wheel. When the parts are in this position wedge 25 may be removed, so as to allow the spring of the rim assisted by the air pressure confined in the tire to partially close the gap between the ends of the rim. After this is done, the notches 26 may readily be brought to register with each other, and the key may then be inserted and driven in until the ends of the rim are brought tightly together, at which time tongue 14 will be firmly seated in the groove of the hoop. The keeper 29 may then be swung upwardly to close the pocket, the bolt 32 and thumb-nut 35 applied, and the wheel is then ready for service.

To remove a worn out or punctured tire, the keeper must first be released. Key 27 may then be withdrawn, and wedge 25 driven between the lugs to expand the rim and tire. After this is done the upper portion of the rim may be swung outwardly clear of the flanges 10, and the rim and tire bodily moved downwardly to allow the filling tube to be withdrawn without injury to the same. The further downward and outward movement of the rim will release it entirely from the wheel.

The practice of carrying one or two extra tires on a car will not be interfered with, by the employment of my detachable rims, for the reason that, extra rims having the tires already mounted and inflated, may be carried with the same facility as the rubber tires are now carried.

Having thus described my invention what I claim as new and desire to secure by Letters Patent, is—

1. The combination in a wheel, of a felly having its ends spaced apart and forming between them a gap extending radially throughout the thickness of the felly, a hoop secured on the felly and having a stirrup-like pocket disposed in said gap and solidly between the ends of the felly and extending radially throughout the thickness of the felly, a split rim surrounding and engaging the hoop and having lugs disposed and movable in the stirrup-like pocket of the hoop, a wedge to spread the lugs apart and expand the rim, and a key to contract the rim.

2. In a vehicle wheel, the combination of a felly provided with a gap in its peripheral portion, a hoop mounted on the felly and having a stirrup seated in the gap and rigidly spacing apart those portions of the felly on opposite sides of the gap, a tire-receiving rim of split form mounted on the hoop, means for direct circumferential connection between the hoop and the rim, lugs on the ends of the rim and projecting into the gap between the sides of the stirrup, a transverse key movable between one of said lugs and a side of the stirrup to contract the rim into circumferential connection with the hoop, and means mounted on the felly for preventing movement of the contracting key out of operative position.

3. A vehicle wheel, comprising a felly split transversely to form a gap therein, a metallic hoop rigidly attached to the felly, said hoop having a stirrup-like portion disposed in the gap of the felly and also having a flange-groove in its periphery, a one-part transversely-split clencher-rim, a lug formed on each side of the split in said rim and adjustably disposed in the stirrup of the hoop, an integral rib on the inner side of said rim adapted to be seated in the groove of the hoop, a wedge to spread the lugs apart and expand the rim to a diameter greater than the flanges of the groove in the hoop, and a key to contract the rim and effect the seating of the tongue in the flange-groove, and also to prevent the creeping of the rim.

4. A vehicle wheel having a felly split transversely to form a gap therein, a metallic hoop rigidly attached to the felly, said hoop having a stirrup-like portion disposed in the gap in the felly, and also having a flange-groove in its periphery, a one-part transversely-split clencher-rim, a lug formed on each side of the split in said rim and adjustably disposed in the stirrup of the hoop, an integral rib on the inner side of said rim adapted to be seated in the groove of the hoop, a wedge to spread the lugs apart and expand the rim to a diameter greater than the flanges of the groove in the hoop, a key to contract the rim and effect the seating of the tongue in the flange-groove, and also to prevent the creeping of the rim, and a keeper to close the stirrup of the hoop and prevent the loss of the key.

5. In a vehicle wheel, the combination of a felly provided in its peripheral portion with a gap, a detachable tire-receiving rim mounted on the felly and of split form, lugs carried by the ends of said rim and projecting into the gap of the felly, a transverse wedge for expanding the ends of the rim and movable between the lugs aforesaid, a key movable between one of the lugs aforesaid and a side of the gap in the felly to contract the rim thereon, and a keeper pivoted to the felly and adapted to prevent displacement of the key when the rim is contracted, said keeper embodying sides practically inclosing the gap in the felly and housing the parts contained therein.

6. In a vehicle wheel, the combination of a felly having a transverse gap, a detachable transversely-split tire-receiving rim mounted on the felly, lugs carried by the end portions of said rim and projecting into the gap of the felly; one of said lugs abutting against one side of the gap and a key adjustable between the other lug and the other side of the gap for contracting the rim on the felly.

In testimony whereof I affix my signature in presence of two witnesses.

THOMAS W. BROOMELL.

Witnesses:
E. S. CRANMER,
WM. J. WOODS.